(12) United States Patent
Lamperth

(10) Patent No.: US 9,525,324 B2
(45) Date of Patent: Dec. 20, 2016

(54) AXIAL FLUX ELECTRICAL MACHINES

(76) Inventor: Michael Lamperth, Woking (GB)

( * ) Notice: Subject to any disclaimer, the term of this patent is extended or adjusted under 35 U.S.C. 154(b) by 734 days.

(21) Appl. No.: 13/883,548

(22) PCT Filed: Nov. 2, 2011

(86) PCT No.: PCT/GB2011/052128
§ 371 (c)(1),
(2), (4) Date: Sep. 20, 2013

(87) PCT Pub. No.: WO2012/059753
PCT Pub. Date: May 10, 2012

(65) Prior Publication Data
US 2014/0145528 A1     May 29, 2014

(30) Foreign Application Priority Data
Nov. 4, 2010 (GB) .................................. 1018605.4

(51) Int. Cl.
| H02K 9/00 | (2006.01) |
|---|---|
| H02K 9/08 | (2006.01) |
| H02K 1/20 | (2006.01) |
| H02K 1/27 | (2006.01) |
| H02K 1/32 | (2006.01) |
| H02K 5/18 | (2006.01) |

(Continued)

(52) U.S. Cl.
CPC ...... *H02K 9/08* (2013.01); *H02K 1/20* (2013.01); *H02K 1/2793* (2013.01); *H02K 1/32* (2013.01); *H02K 5/18* (2013.01); *H02K 5/20* (2013.01); *H02K 9/19* (2013.01); *H02K 9/22* (2013.01); *H02K 9/06* (2013.01); *H02K 21/24* (2013.01)

(58) Field of Classification Search
CPC .......... H02K 1/2793; H02K 9/22; H02K 9/08; H02K 1/32; H02K 9/19
USPC ............................ 310/52–59, 112, 266, 268
See application file for complete search history.

(56) References Cited

U.S. PATENT DOCUMENTS

| 4,068,143 A | * | 1/1978 | Whiteley | ............... H02K 23/54 |
|---|---|---|---|---|
| | | | | 310/198 |
| 4,190,780 A | * | 2/1980 | Whiteley | ................. H02K 9/19 |
| | | | | 310/268 |

(Continued)

FOREIGN PATENT DOCUMENTS

| EP | 2262081 A1 | 12/2010 |
|---|---|---|
| GB | 490062 A | 8/1938 |

(Continued)

OTHER PUBLICATIONS

International Preliminary Report on Patentability for International Application No. PCT/GB2011/052128, dated Aug. 7, 2013.

(Continued)

*Primary Examiner* — Thanh Lam
(74) *Attorney, Agent, or Firm* — Polsinelli PC

(57) ABSTRACT

An axial flux electrical machine comprises a substantially sealed housing (10) defining a fluid flow path (20), a heat exchanger (22) for transferring heat energy from a fluid flowing in the fluid flow path to another fluid, a stator (16) located within the housing (10), a rotatable shaft (12), a rotor (18) located within the housing (10) on the shaft (12) adjacent the stator (16) and rotatable with respect to the stator (16), wherein the fluid flow path extends between the stator (16) and the rotor (18).

19 Claims, 6 Drawing Sheets

(51) Int. Cl.
*H02K 5/20* (2006.01)
*H02K 9/19* (2006.01)
*H02K 9/22* (2006.01)
H02K 9/06 (2006.01)
H02K 21/24 (2006.01)

(56) References Cited

U.S. PATENT DOCUMENTS

| | | | |
|---|---|---|---|
| 5,650,674 | A | 7/1997 | Hayashi |
| 2006/0145562 | A1* | 7/2006 | Nakayama ............. H02K 1/146 310/216.012 |
| 2011/0241350 | A1* | 10/2011 | Kori ..................... H02K 1/20 290/55 |

FOREIGN PATENT DOCUMENTS

| | | | | |
|---|---|---|---|---|
| GB | 1106989 | A | | 3/1968 |
| GB | 1404485 | A | | 8/1975 |
| GB | 2174252 | A * | 10/1986 | ............... H02K 3/04 |
| JP | 5630581 | | | 8/1979 |
| JP | 54137111 | U | | 9/1979 |
| JP | 56048262 | U | | 5/1981 |
| JP | 57045272 | | | 3/1982 |
| JP | 2006014399 | A | | 1/2006 |
| WO | 2012059753 | A1 | | 5/2012 |

OTHER PUBLICATIONS

Written Opinion of the International Searching Authority for International Application No. PCT/GB2011/052128, dated Aug. 7, 2013.
English Abstract for JP Publication No. 54-137111, published Oct. 24, 1979.
English Abstract for JP Publication No. 57-045272, published Mar. 15, 1982.
English Abstract for JP Publication No. 56-048262, published May 1, 1981.
Search Report for GB Application No. GB1018605.4 dated Feb. 23, 2011.
Notification of Transmittal of The International Search Report and The Written Opinion of the International Searching Authority, or the Declaration for International Application No. PCT/GB2011/052128 dated Jan. 25, 2012; 1 page.
International Search Report for International Application No. PCT/GB2011/052128 dated Jan. 25, 2012; 4 pages.
Written Opinion of the International Searching Authority for International Application No. PCT/GB2011/052128 dated Jan. 25, 2012; 7 pages.
GB Search Report for GB Application No. 1018605.4 dated Feb. 23, 2011; 2 pages.
English Abstract for JP Publication No. 62296738 published Dec. 24, 1987; 1 page.
English Abstract for JP Publication No. 2007020382 published Jan. 25, 2007; 1 page.
English Abstract for JP Publication No. 2006014399 published Jan. 12, 2006; 1 page.
English Abstract for JP Publication No. 2005269845 published Sep. 29, 2005; 1 page.

* cited by examiner

AXIAL FLUX ELECTRICAL MACHINES

CROSS-REFERENCE TO RELATED APPLICATIONS

This application is a national stage entry of PCT/GB2011/052128, which was filed on Nov. 2, 2011, which claims priority to GB 1018605.4, filed Nov. 4, 2010, both of which applications are expressly incorporated herein in their entireties.

The present invention relates to axial flux electrical machines.

BACKGROUND OF THE INVENTION

Axial flux electrical machines can provide high power outputs and compact dimensions, leading to desirably high power densities. However, high magnetic field and electric current densities in such machines can lead to significant overheating issues, particularly in respect of the permanent magnets used in such machines.

Existing axial flux electrical machines make use of open chassis to provide air flow cooling for the magnetic and electrical components. However, such designs do not provide the required amount of cooling for higher power machines It is therefore desirable to provide an axial flux electrical machine that can mitigate the problems of overheating, particularly in higher power axial flux electrical machines.

SUMMARY OF THE INVENTION

According to one aspect of the present invention, there is provided an axial flux electrical machine comprising a substantially sealed housing, a stator mounted on, and located within, the housing, a rotatable shaft located at least partially within the housing and extending through the stator, and a rotor located on the shaft within the housing adjacent the stator, the rotor being rotatable with respect to the stator, wherein a fluid flow path is defined within the housing, the fluid flow path having a first portion which extends between the stator and the rotor, a second portion that extends between the stator and the housing and a third portion which links the first and second portions, such that the first, second and third portions form a contiguous cooling path within the housing.

Such an electrical machine may further comprise a second stator located within the housing such that the rotor is positioned between the first and second stators, wherein a second fluid flow path is defined within the housing, the second fluid flow path having a first portion which extends between the second stator and the rotor, a second portion that extends between the second stator and the housing and a third portion which links the first and second portions, such that the first, second and third portions form a second contiguous cooling path within the housing.

The or each stator may define fluid flow channels therethrough, which fluid flow channels extend radially from an outer edge region of the stator concerned to an inner edge region thereof, the outer edge region being adjacent, and spaced from, a portion of the housing, and the inner region being adjacent, and spaced from, the shaft, the fluid flow channels providing at least part of the third portion of the associated fluid flow path.

The or each stator is preferably in thermal contact with the housing.

Such a machine may further comprise a heat exchanger for transferring heat energy from a fluid flowing in a fluid flow path to another fluid. Such a heat exchanger may comprise a first part located within the housing and arranged to contact fluid flowing in the fluid flow path, and a second part external to the housing and in thermal contact with the first part. The second part of the heat exchanger may be provided with air or liquid cooling.

The housing may be substantially filled with a cooling fluid chosen from a gas, a gas mixture, a liquid and a liquid mixture.

The rotor may be provided with features of shape that are arranged to move a cooling fluid along the or each fluid flow path when the machine is in use.

The rotor may comprise a frame, and a plurality of magnets mounted in the frame, the frame having a first axial thickness, and the magnets having a second axial thickness, the second axial thickness being less than the first axial thickness.

According to another aspect of the present invention, there is provided an axial flux electrical machine comprising a substantially sealed housing, a shaft that extends within the housing, a rotor mounted on the shaft within the housing, and a stator mounted within the housing, wherein the housing, rotor and stator define at least one contiguous fluid flow path within the housing, the fluid flow path having a first substantially radial portion, a second substantially axial portion, and a third portion that links the first and second portions

DETAILED DESCRIPTION OF THE PREFERRED EMBODIMENTS

Figure 1:
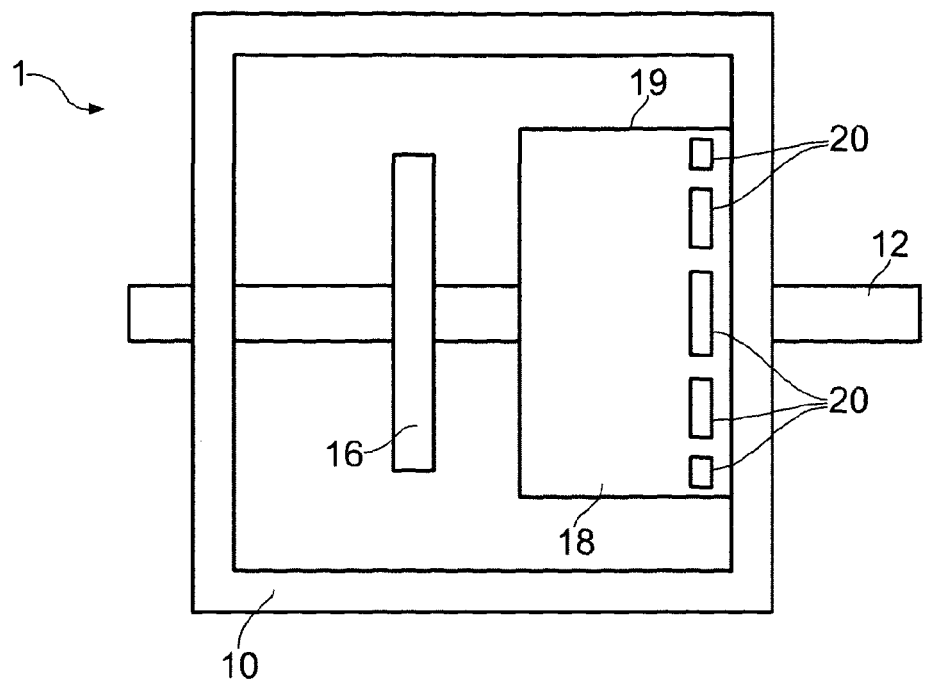
FIG. 1 is a schematic diagram of a single sided axial flux electrical machine embodying the present invention.

FIG. 1 is a schematic illustration of a single-sided axial flux electrical machine embodying the present invention. The machine 1 comprises a housing 10 through which a rotatable shaft 12 extends, supported by bearings (not shown in FIG. 1). It will be appreciated that the shaft can extend out of both sides of the housing 10, as shown in FIG. 1, or out of a single side only. The exact nature of the shaft mounting is not of importance for the following description of embodiments of the present invention.

A rotor 16 is mounted on the shaft 12 and is rotatable with respect to the housing. A stator 18 is provided within the housing 10 and the shaft 12 passes through the stator. The shaft 12 and rotor 16 are rotatable with respect to the stator 18.

The stator is provided with cooling channels 20, which extend from a radially outer surface of the stator 18 to a radially inward surface (not shown in FIG. 1) adjacent the shaft 12.

Figure 2:
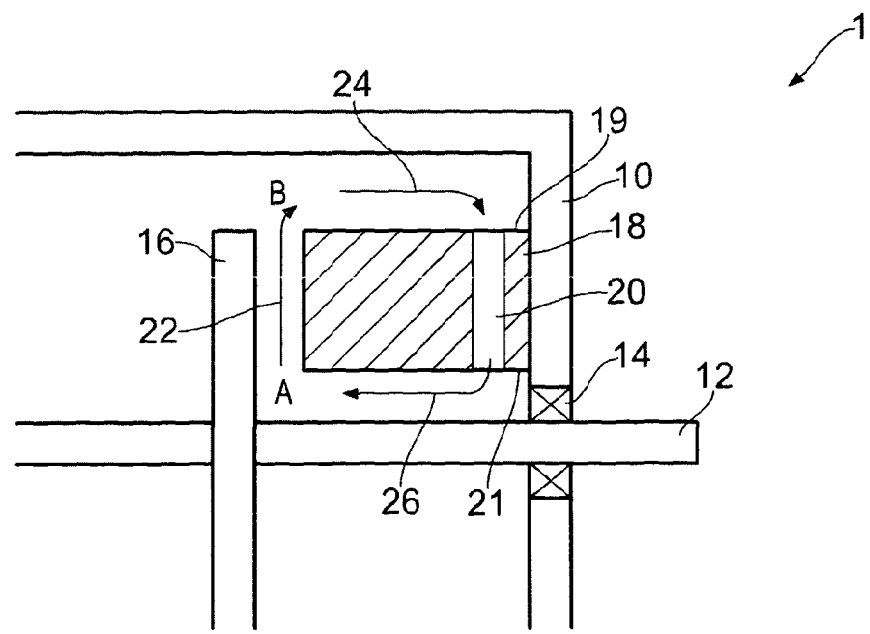
FIG. 2 is a cross-sectional diagram of the electrical machine of FIG. 1.

FIG. 2 is a cross-sectional view of part of the electrical machine of FIG. 1. The shaft 12 can be seen to pass through the housing 10, supported by bearings 14. The rotor 16 is attached to the shaft 12, and rotates therewith. The stator 18 is attached to an inner surface of the housing, and has a radially outer surface 19 adjacent, but spaced from, another inner surface of the housing 10. The stator 18 also has a radially inner surface 21 which is adjacent, but spaced from, the shaft 12. The cooling channels 20 provide a link between the radially outer and inner surfaces 19 and 21 of the stator. The stator 18 is attached to the housing in such a way as to allow heat transfer between the two parts.

When in use, the rotor 16 rotates with respect to the housing 10 and the stator 18, and causes a low pressure region A to be formed at the radially inner portion of the rotor 16, and stator 18. A high pressure region B is created at a radially outer region of the rotor 16, and stator 18. The pressure difference is caused by the rotor 16 acting as a centrifugal fan or pump. Since the cooling channels 20 are provided, then cooling fluid (gas or liquid) is allowed to flow from the radially outer region to the radially inner region, back to the low pressure region A.

The cooling channels 20 thereby provide a continuous cooling fluid path within the housing. The cooling fluid path is made up of three contiguous portions: a first portion 22 which extends between the rotor 16 and the stator 18, a second portion 24 that extends from the high pressure region B to the low pressure region A through the cooling channels 20 of the stator 18, and a third portion that extends between the stator 18 and the shaft 12.

The stator 18 is attached to, and is in thermal contact with, the housing 10, and so cooling fluid that is pumped around the contiguous cooling fluid path 22, 24, 26 passes a portion of the stator 18 that is cooler than the inner temperature of the machine, by virtue of the fact that the portion of the stator is in thermal contact with the housing 10. As such, the flow of cooling fluid can remove heat from the rotor and stator, and lose heat through the housing wall to which the stator is connected. The stator 18 and housing 10 thereby effectively act as a heat exchanger for the cooling fluid.

Accordingly, the fluid flow caused by rotation of the rotor 18 is used to enable cooling of the fluid, and hence cooling of the axial flux machine.

Figure 3:
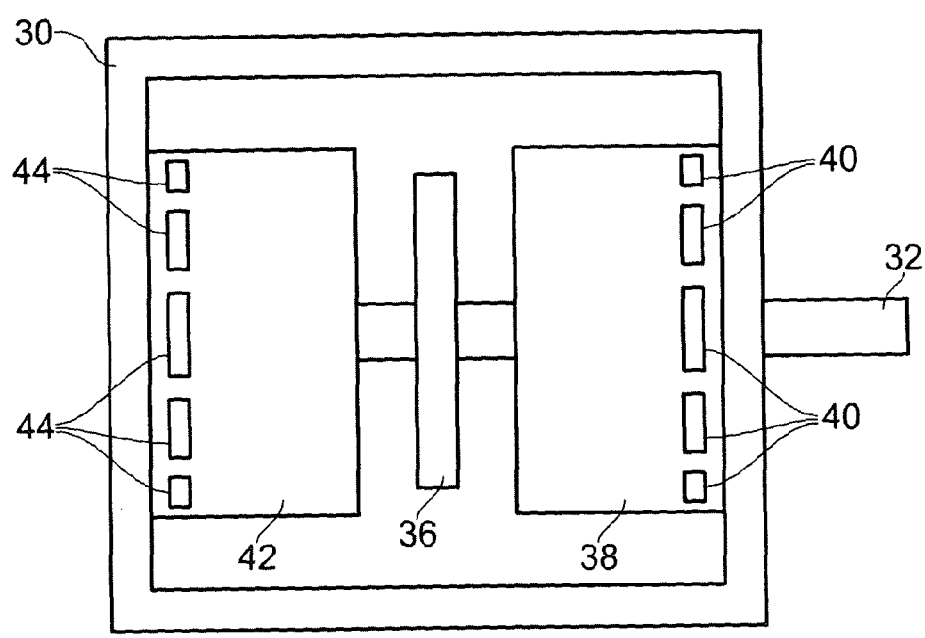
FIG. 3 is a schematic diagram of a double sided axial flux electrical machine embodying the present invention.

FIG. 3 is a schematic illustration of a double-sided axial flux electrical machine which is similar in structure to the single-sided machine of FIG. 1. In the machine shown in FIG. 3, a housing 30 carries a shaft 32 on bearings, as before. A single rotor 36 is mounted on the shaft and rotates therewith. First and second stators 38 and 42 are provided and are attached with respective inner walls of the housing 30, and are arranged to either side of the rotor 36, such that the rotor 36 is rotatable between the two stators 38 and 42. As in the machine shown in FIGS. 1 and 2, each stator 38, 42 is provided with cooling channels 40, 44.

Figure 4:
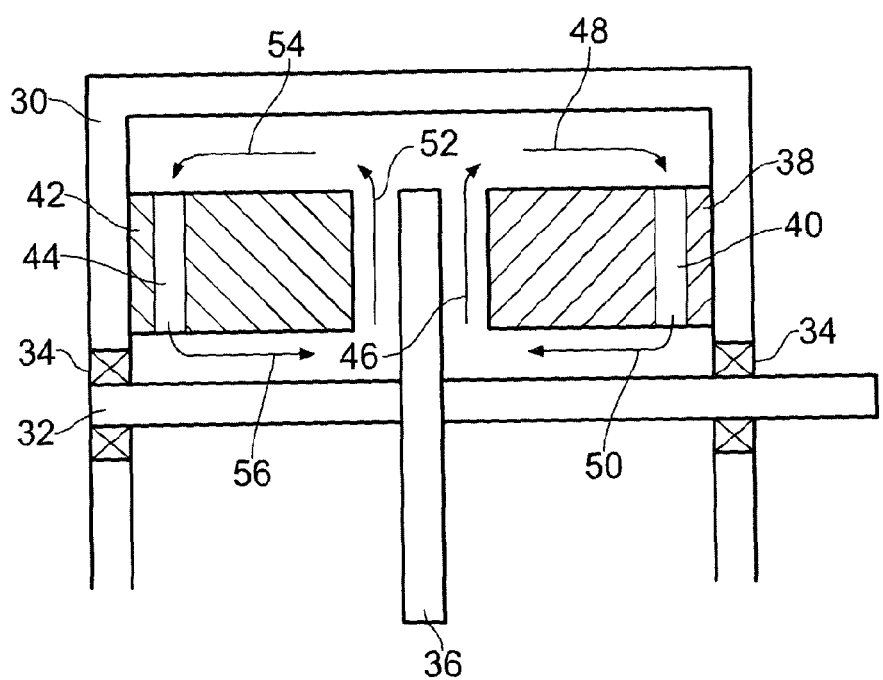
FIG. 4 is a cross-sectional diagram of the electrical machine of FIG. 3.

As shown in FIG. 4, the cooling channels 40, 44 enable the provision of two fluid flow paths 46, 48, 50 and 52, 54, 56. Each fluid flow path passes through a stator which is thermally attached with the housing, such that heat can flow from the stator to the housing to be dissipated in the ambient air. FIG. 4 illustrates only part of the machine of FIG. 3, and shows that the shaft 32 is supported in the housing by bearings 34.

The structures shown in FIGS. 1 to 4 enable cooling fluid to flow around hotter parts of the machine (that is, the rotor and stator) and through an effective heat exchanger that transfers heat away from the fluid flowing in the fluid flow path or paths, thereby enabling cooling of the stators and the rotor. It will be appreciated that the cooling channels 20, 40, 44 can be of any suitable geometry, size and spacing. The channels are chosen to provide effective heat transfer from the cooling fluid to the stator/housing 18/10.

Figure 5:
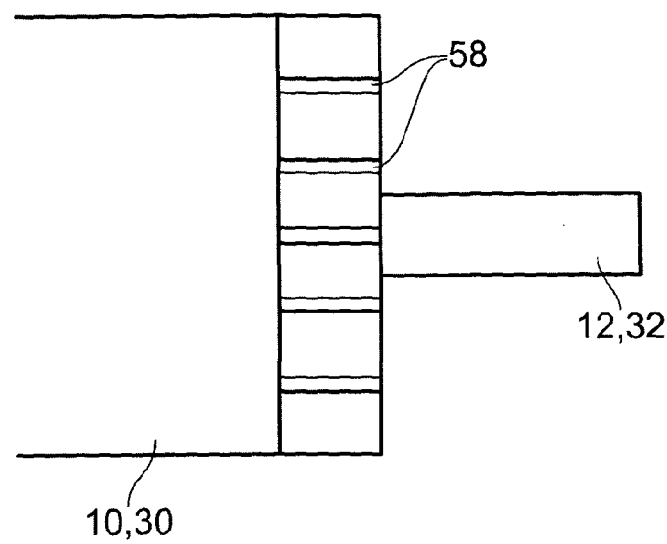
FIGS. 5 and 6 illustrate a first exemplary heat exchanger for use with a machine as shown in FIG. 1, 2, 3 or 4.
Figure 6:
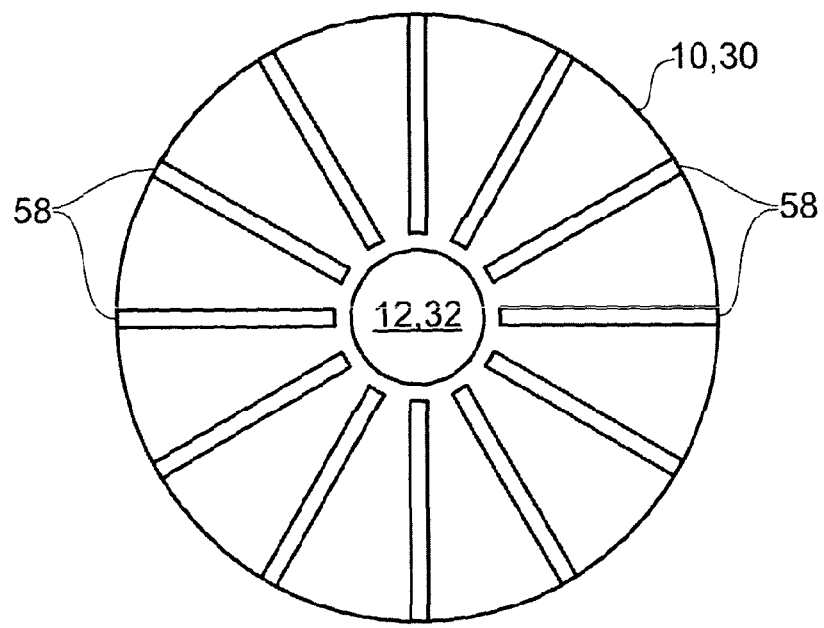

FIGS. 5 and 6 illustrate side and end views respectively of one possible heat exchanger fitted to an outer surface of the housing. This example heat exchanger comprises a plurality of fins that extend axially and radially from and end of the housing 30. The fins provide a large surface area from which heat transferred from the internal structure of the machine can be dissipated. Such a structure improves the heat dissipation by providing a large fin surface area. The fins may be attached to the housing 10, or may be provided by the casting or machining of the housing 10. The shape and configuration of the fins shown ion FIGS. 5 and 6 is exemplary and it will be readily appreciated that the shape and configuration can be altered in order to provide suitable heat dissipation characteristics.

Figure 7:
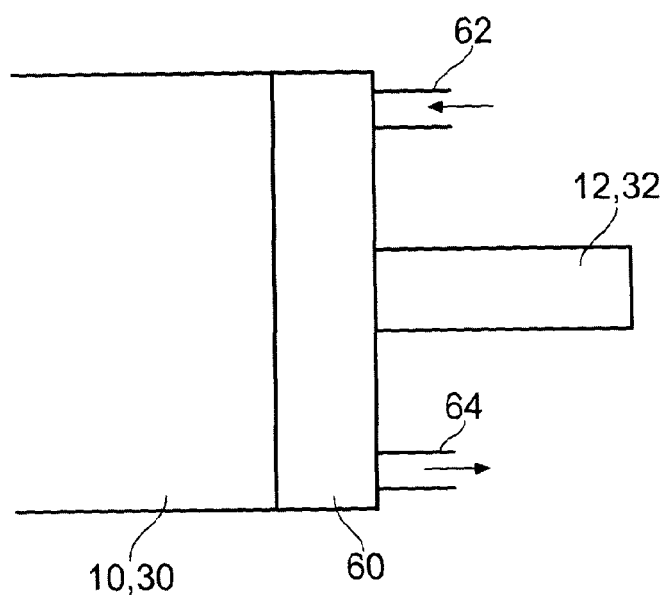
FIG. 7 illustrate a second exemplary heat exchanger for use with a machine as shown in FIG. 1, 2, 3 or 4.

FIG. 7 illustrates a water-cooled heat exchanger attached to an outer end surface of the housing 10. The heat exchanger 60 comprises a water jacket having an inlet 62 and an outlet 64. Cooling fluid, such as air, water or oil, can be pumped into and out of the jacket 60 via inlet and outlet connections 52 and 64.

Figure 8:
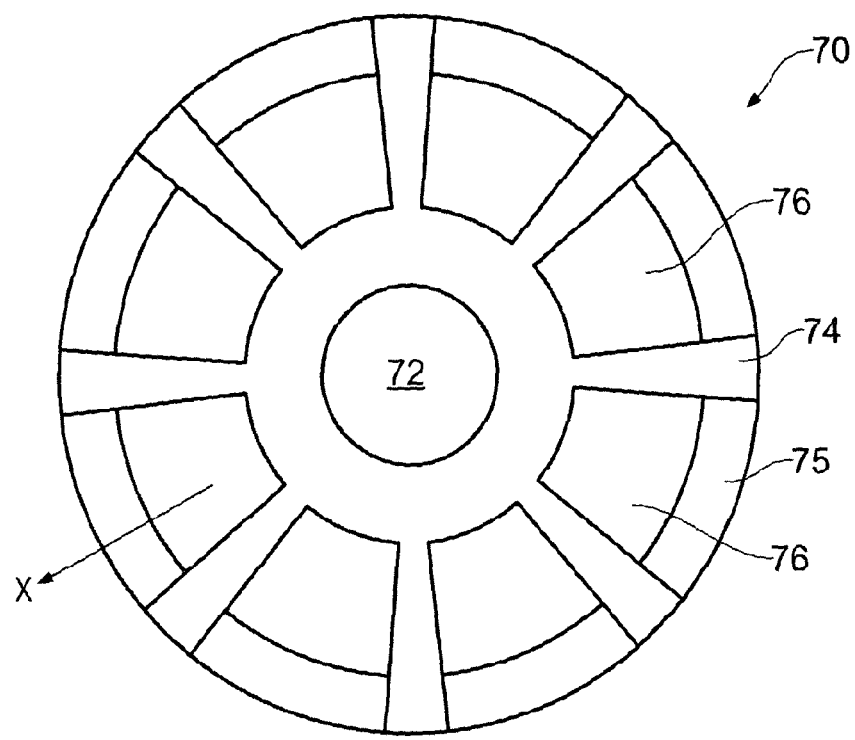
FIGS. 8 and 9 illustrate respective views of a rotor suitable for use in the machines shown in FIGS. 1 to 4.
Figure 9:
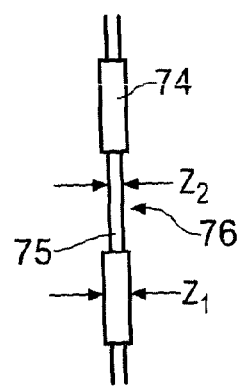

FIGS. 8 and 9 illustrate respective end and partial side views of a rotor 70 suitable for use in a machine such as that shown in FIGS. 1 to 4 described above. The rotor 70 comprises a frame having a mounting region 72 for attachment to a shaft. The frame also comprises a plurality of radial arms 74 that extend radially outwardly from the mounting region 72. The arms 74 have and axial thickness $z_1$, as illustrated in FIG. 9.

A plurality of permanent magnets 76 are mounted in the frame between adjacent arms 74. The magnets 76 engage with features of shape of the arms 74 in order to locate in the rotor 70 52 and a series of magnets 54 which are held in the frame 52. The frame also includes circumferential portions 75 which extend between the arms 74 at a radially outer edge of the rotor 70. The circumferential portions 75 serve to hold the magnets 76 radially in the rotor 70. The circumferential portions have an axial thickness $z_2$ which is less that the axial thickness $z_1$ of the arms. The magnets also have an axial thickness less than that of the arms. Such a difference in thickness creates features of shape of the rotor 70 that enhance the flow of cooling fluid around the fluid flow path or paths. The reduced thickness of the circumferential portions relative to the arms means that cooling fluid can pass outwardly from the rotor 70.

In addition, the stepped shape of the frame and magnets results in improved heat transfer from the magnets to the cooling fluid.

In one example of an electrical machine embodying the present invention, the housing 10 is sealed and is filled with a gas or gas mixture such as nitrogen or air. In such a case the channels of the stator(s) are designed so that a desired amount of heat can be removed from the gas or gas mixture flowing around the fluid flow path or paths.

In another example of an electrical machine embodying the present invention, the housing 10 is again sealed, and is filled with a cooling liquid, such as oil, and the cooling liquid flows around the fluid flow path or paths. In such a case, the cooling channels of the stator(s) are designed to remove a desired amount of heat from the cooling fluid.

Although aspects of the invention have been described with reference to the embodiment shown in the accompanying drawings, it is to be understood that the invention is not limited to the precise embodiment shown and that various changes and modifications may be effected without further inventive skill and effort.

It will also be appreciated that the embodiments and examples shown in the Figures are not drawn to scale but to enhance the clarity of the drawings.

The invention claimed is:

1. An axial flux electrical machine comprising:
a substantially sealed housing;
a stator mounted on, and located within, the housing;
a rotatable shaft located at least partially within the housing and extending through the stator; and
a rotor located on the shaft within the housing adjacent the stator, the rotor being rotatable with respect to the stator,
wherein a fluid flow path is defined within the housing, the fluid flow path having a first portion which extends between the stator and the rotor, a second portion that extends between the stator and the housing and a third portion which links the first and second portions, such that the first, second and third portions form a contiguous cooling path within the housing,
wherein the stator defines fluid flow channels therethrough, the fluid flow channels extending radially from an outer edge region of the stator to an inner edge region thereof, the outer edge region being adjacent, and spaced from, the shaft, the fluid flow channels providing at least part of the third portion of the associated fluid flow path.

2. An electrical machine as claimed in claim 1, further comprising a second stator located within the housing such that the rotor is positioned between the stator and the second stator, wherein a second fluid flow path is defined within the housing, the second fluid flow path having a first portion which extends between the second stator and the rotor, a second portion that extends between the second stator and the housing and a third portion which links the first and second portions, such that the first, second and third portions form a second contiguous cooling path within the housing.

3. An electrical machine as claimed in claim 1, wherein the stator is in thermal contact with the housing.

4. An electrical machine as claimed in claim 1, further comprising a heat exchanger for transferring heat energy from a fluid flowing in a fluid flow path to another fluid.

5. An electrical machine as claimed in claim 4, wherein the heat exchanger comprises first part located within the housing and arranged to contact fluid flowing in the fluid flow path, and a second part external to the housing and in thermal contact with the first part.

6. An electrical machine as claimed in claim 5, wherein the second part of the heat exchanger is provided with air or liquid cooling.

7. An electrical machine as claimed in claim 1, wherein the housing is substantially filled with a cooling fluid chosen from a gas, a gas mixture, a liquid and a liquid mixture.

8. An electrical machine as claimed in claim 1, wherein the rotor is provided with features of shape that are arranged to move a cooling fluid along the or each fluid flow path when the machine is in use.

9. An electrical machine as claimed in claim 1, wherein the rotor comprises a frame, and a plurality of magnets mounted in the frame, the frame having a first axial thickness, and the magnets having a second axial thickness, the second axial thickness being less than the first axial thickness.

10. An axial flux electrical machine comprising:
a substantially sealed housing;
a stator mounted on, and located within, the housing;
a rotatable shaft located at least partially within the housing and extending through the stator; and
a rotor located on the shaft within the housing adjacent the stator, the rotor being rotatable with respect to the stator,
wherein a fluid flow path is defined within the housing, the fluid flow path having a first portion which extends between the stator and the rotor, a second portion that extends between the stator and the housing and a third portion which links the first and second portions, such that the first, second and third portions form a contiguous cooling path within the housing, and
wherein the rotor comprises a frame, and a plurality of magnets mounted in the frame, the frame having a first axial thickness, and the magnets having a second axial thickness, the second axial thickness being less than the first axial thickness.

11. An electrical machine as claimed in claim 10, further comprising a second stator located within the housing such that the rotor is positioned between the stator and the second stator, wherein a second fluid flow path is defined within the housing, the second fluid flow path having a first portion which extends between the second stator and the rotor, a second portion that extends between the second stator and the housing and a third portion which links the first and second portions, such that the first, second and third portions form a second contiguous cooling path within the housing.

12. An electrical machine as claimed in claim 10, wherein the stator is in thermal contact with the housing.

13. An electrical machine as claimed in claim 10, further comprising a heat exchanger for transferring heat energy from a fluid flowing in a fluid flow path to another fluid.

14. An electrical machine as claimed in claim 13, wherein the heat exchanger comprises first part located within the housing and arranged to contact fluid flowing in the fluid flow path, and a second part external to the housing and in thermal contact with the first part.

15. An electrical machine as claimed in claim 14, wherein the second part of the heat exchanger is provided with air or liquid cooling.

16. An electrical machine as claimed in claim 10, wherein the housing is substantially filled with a cooling fluid chosen from a gas, a gas mixture, a liquid and a liquid mixture.

17. An electrical machine as claimed in claim 10, wherein the rotor is provided with features of shape that are arranged to move a cooling fluid along the or each fluid flow path when the machine is in use.

18. An electrical machine as claimed in claim 10, wherein the rotor comprises a frame, and a plurality of magnets mounted in the frame, the frame having a first axial thickness, and the magnets having a second axial thickness, the second axial thickness being less than the first axial thickness.

19. An electrical machine as claimed in claim 10, wherein the stator defines fluid flow channels therethrough, the fluid flow channels extending radially from an outer edge region of the stator to an inner edge region thereof, the outer edge region being adjacent, and spaced from, the shaft, the fluid flow channels providing at least part of the third portion of the associated fluid flow path.

* * * * *